(12) United States Patent
Gao

(10) Patent No.: US 11,243,336 B2
(45) Date of Patent: Feb. 8, 2022

(54) GLASS LENS AND LENS MODULE

(71) Applicant: AAC Optics Solutions Pte. Ltd., Singapore (SG)

(72) Inventor: Yuchan Gao, Shenzhen (CN)

(73) Assignee: AAC Optics Solutions Pte. Ltd., Singapore (SG)

( * ) Notice: Subject to any disclaimer, the term of this patent is extended or adjusted under 35 U.S.C. 154(b) by 124 days.

(21) Appl. No.: 16/706,735

(22) Filed: Dec. 7, 2019

(65) Prior Publication Data
US 2020/0209437 A1 Jul. 2, 2020

(30) Foreign Application Priority Data
Dec. 30, 2018 (CN) .......................... 201822279258.6

(51) Int. Cl.
*G02B 3/02* (2006.01)
*G02B 7/02* (2021.01)

(52) U.S. Cl.
CPC ............... *G02B 3/02* (2013.01); *G02B 7/021* (2013.01); *G02B 7/022* (2013.01)

(58) Field of Classification Search
CPC . G02B 7/00; G02B 7/02; G02B 7/003; G02B 7/022; G02B 7/021; G02B 7/0988; G02B 3/02; G02B 13/0045; G02B 27/00; G02B 27/0018; G02B 27/0025; G02B 5/003; G02B 5/005
USPC ....... 359/362, 363, 601, 611, 738, 748, 740, 359/741, 784, 811, 819
See application file for complete search history.

(56) References Cited

U.S. PATENT DOCUMENTS

2013/0050850 A1 2/2013 Lin

FOREIGN PATENT DOCUMENTS

| CN | 206671646 B1 | 11/2017 |
|---|---|---|
| JP | 2010217279 A1 | 9/2010 |
| JP | 2011153965 A1 | 8/2011 |

OTHER PUBLICATIONS

English Translation of JP 2010217279, machine translated on Apr. 7, 2021. (Year: 2010).*
1st Office Action dated Jan. 30, 2020 by JPO in related Japanese Patent Application No. 2019194720 (4 Pages).
PCT search report dated Feb. 1, 2020 by SIPO in related PCT Patent Application No. PCT/CN2019/113867 (5 Pages).

* cited by examiner

*Primary Examiner* — Jie Lei
(74) *Attorney, Agent, or Firm* — W&G Law Group

(57) ABSTRACT

The present invention provides a glass lens for a lens module. The glass lens includes an optical portion having an optical axis, and an extending portion surrounding a periphery of the optical portion. The optical portion includes an object-side surface and an image-side surface opposite to the object-side surface, and the extending portion includes a first extending surface extending from the object-side surface towards a direction far away from the optical axis and a second extending surface extending from the image-side surface towards the direction far away from the optical axis. The first extending surface and the second extending surface are respectively provided with a first recess and a second recess filled with a black substance, and the second recess is closer to the optical axis with respect to the first recess.

16 Claims, 2 Drawing Sheets

GLASS LENS AND LENS MODULE

TECHNICAL FIELD

The present disclosure relates to the field of optical technologies, and more particularly to a glass lens and a lens module.

BACKGROUND

With the gradual maturity of optical imaging technologies, various imaging products such as cameras, video cameras, telescopes and the like are also popularized to thousands of households, and the design of lens modules has always been the key to the imaging quality of such products. However, due to the overall transparency of the glass lenses used in the current lens modules, stray light caused by each bearing surface and a connecting surface with a lens barrel after a plurality of lenses are stacked will often irradiate into an optical portion, thereby greatly affecting the imaging effect.

Therefore, it is necessary to provide a novel glass lens to solve the above-mentioned technical problems.

DETAILED DESCRIPTION

The present disclosure is further illustrated hereinafter with reference to the drawings and embodiments.

Figure 1:
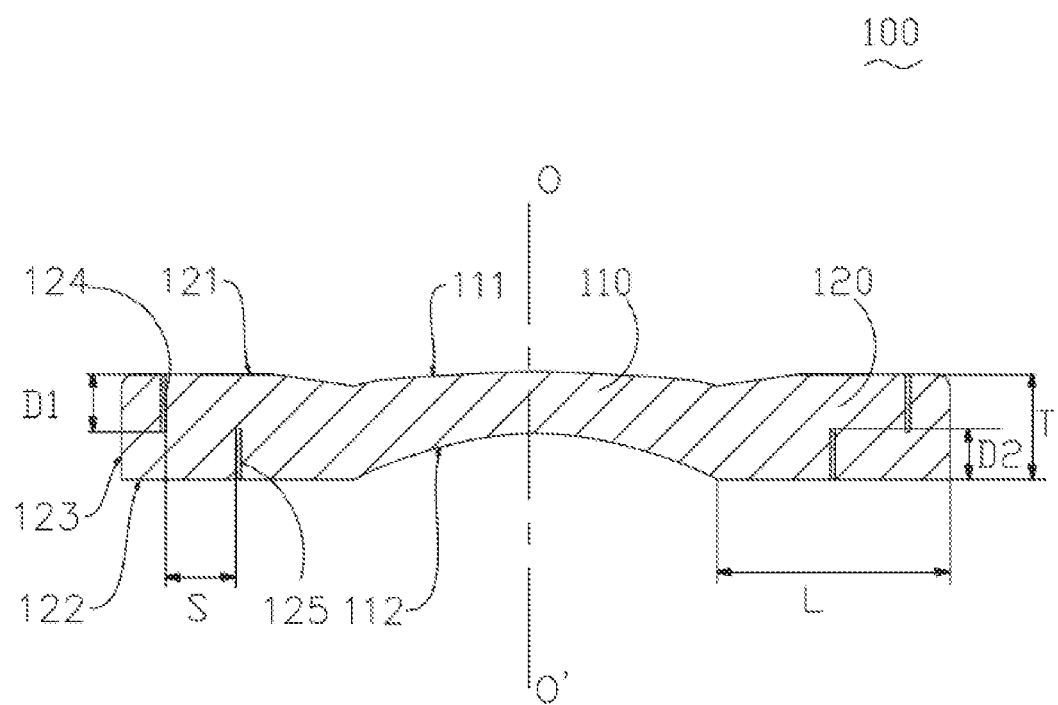
FIG. 1 is a schematic view of a glass lens provided by the present disclosure.

Referring to FIG. 1, the present disclosure discloses a glass lens 100 for a lens module 10. It can be understood that the lens module 10 has a light through hole 210 for light to incident. The glass lens 100 includes an optical portion 110 and an extending portion 120. The optical portion 110 has an optical axis OO', and includes an object-side surface 111 facing the light through hole 210, and an image-side surface 112 facing back to the light through hole 210. The extending portion 120 surrounds a periphery of the optical portion 110, and includes a first extending surface 121 and a second extending surface 122. The first extending surface 121 is connected with the object-side surface 111, and the second extending surface 122 is connected with the image-side surface 112. The second extending surface 122 extends from the image-side surface 112 towards a direction far away from the optical axis OO'. The extending portion 120 further includes a connecting surface 123 connecting the first extending surface 121 and the second extending surface 122. In the embodiment, both the first extending surface 121 and the second extending surface 122 are vertical to the optical axis OO', while the connecting surface 123 is parallel to the optical axis OO'. The first extending surface 121 is provided with a first recess 124, the second extending surface 122 is provided with a second recess 125, the second recess 125 is closer to the optical axis OO' with respect to the first recess 124, and the second recess 125 is filled with a black substance. Meanwhile, in the embodiment, a size of the first recess 124 along an extension direction of the optical axis OO' is disposed as a first recess depth D1, a size of the second recess 125 along the extension direction of the optical axis OO' is disposed as a second recess depth D2, a distance between the first extending surface 121 and the second extending surface 122 along the extension direction of the optical axis OO' is disposed as an extension thickness T, and the extension thickness T is less than or equal to a sum of the first recess depth D1 and the second recess depth D2. In this way, the black substance filled in the second recess 125 can absorb stray light caused by each surface of the lens and internal light reflection; the first recess 124 can change a light path of the stray light, so that more stray light is collected at the second recess 125 and absorbed by the black substance in the second recess 125, thereby reducing a dead angle for absorbing the stray light, improving the effective absorbance of the black substance, blocking more stray light outside the optical portion 110, and further preventing the stray light affecting the imaging effect from irradiating into the optical portion 110, thus optimizing the imaging effect of the lens module 10.

In one embodiment, both the first recess 124 and the second recess 125 are filled with the black substance, thus further expanding an absorption range of the stray light, enabling the stray light reflected or refracted from more directions to be effectively absorbed, and further optimizing the imaging effect of the lens module 10.

Moreover, the black substance filled in the first recess 124 and the second recess 125 can be made of various materials, such as plastic or glue. From the aspect of color, black has the best light absorption effect among all colors. Therefore, in order to absorb more stray light that may interfere with the imaging effect and further improve the imaging quality, in this embodiment, black plastic or black glue is preferably used. It is understood that the first recess 124 and the second recess 125 may be filled with substances in other dark colors or other substances.

In order to make the absorptance of the stray light higher, the following parameters of the glass lens 100 are optimized.

A first plane vertical to the optical axis OO' is disposed, an projection of the first recess 124 on the first plane and a projection of the second recess 125 on the first plane are spaced apart from each other, that is, the two projection do not overlap with each other, i.e., the projection of the first recess 124 on the first plane and the projection of the second recess 125 on the first plane are neither intersected nor coincided with each other.

The second recess depth D2 is greater than one quarter of the extension thickness T and less than two thirds of the extension thickness T.

A difference between a distance from the first recess 124 to the optical axis OO' and a distance from the second recess 125 to the optical axis is defined as a recess spacing S, a dimension of the extending portion 120 in the direction vertical to the optical axis OO' is defined as an extension width L, and the extension width L is greater than twice the recess spacing S. In other words, the above may also be expressed as follows: a reference circle located in the first plane is disposed, a circle center of the reference circle is on the optical axis OO', a distance between the first recess 124 and the second recess 125 along any diameter direction of the reference circle is disposed as the recess spacing S, and a dimension of the extending portion 120 along any diameter direction of the reference circle is disposed as the extension width L, and the extension width L is greater than twice the recess spacing S.

It can be understood that the above structure optimization solution is only one preferred solution of the embodiment, and may be appropriately adjusted according to specific needs, which will not be uniquely limited here.

In one embodiment, a size of at least one of the first recess 124 and the second recess 125 is less than or equal to 0.1 mm along a direction vertical to the optical axis OO'. That is, the size of the first recess 124 along the direction vertical to the optical axis OO' is less than or equal to 0.1 mm, or the size of the second recess 125 along the direction vertical to the optical axis OO' is less than or equal to 0.1 mm, or the sizes of the first recess 124 and the second recess 125 along the direction vertical to the optical axis OO' are both less than or equal to 0.1 mm. Preferably, in the embodiment, the size of the second recess 125 in any diameter direction of the reference circle is 0.1 mm.

In one embodiment, both the first recess 124 and the second recess 125 are annular recesses, and a central axis of the first recess 124 and a central axis of the second recess 125 are coincident with the optical axis OO'. In this way, from the view of appearance, the annular structure can have more rounded and beautiful lines. From the view of structure, the annular structure can facilitate filling the black substance into the recess smoothly and evenly, and can block the stray light from entering the optical portion 110 to a larger extent. Of course, in other embodiments of the present disclosure, the first recess 124 and the second recess 125 may not be of an annular structure, or one of the first recess 124 and the second recess 125 may be of an annular structure while the other is of a non-annular structure, which depends on specific needs and is not uniquely limited here.

Moreover, a section of the first recess 124 along a direction parallel to the optical axis OO' is rectangular; and a section of the second recess 125 along the direction parallel to the optical axis OO' is also rectangular. In other words, the above may also be expressed as follows: any plane passing through the optical axis OO' is defined as a second plane, and a section of the first recess 124 parallel to the second plane is rectangular; and a section of the second recess 125 parallel to the second plane is rectangular. Such recesses are not only convenient for processing, but also have less influence on an overall structure strength of the glass lens 100.

Figure 2:
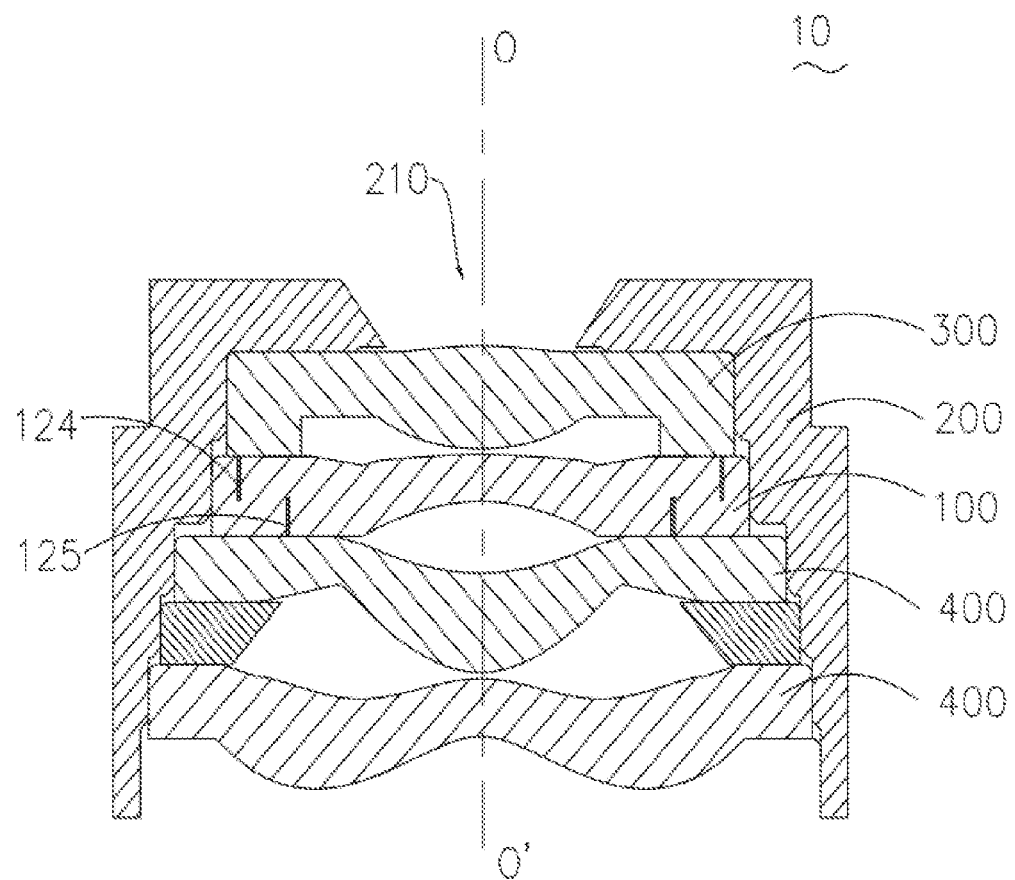
FIG. 2 is a schematic view of a lens module provided by the present disclosure.

Referring to FIG. 1 to FIG. 2, the present disclosure further provides a lens module 10. The lens module 10 includes a lens barrel 200, the glass lens 100 mentioned above, as well as a first lens 300 and a second lens 400 stacked with the glass lens 100 mentioned above. The lens barrel 200 is provided with a light through hole 210 and an accommodating housing communicated with the light through hole 210. The first lens 300 is disposed on the side where the object-side surface 111 of the glass lens 100 is located, and the second lens 400 is disposed on the side where the image-side surface 112 of the glass lens 100 is located. Of course, in other embodiments of the present disclosure, both the first lens 300 and the second lens 400 can be increased or decreased in number according to actual conditions, which will not be uniquely limited here.

The lens module 10 provided by the present disclosure has all the beneficial effects of the glass lens 100 mentioned above since the glass lens 100 mentioned above is employed in the lens module, which will not be elaborated here.

The description above is merely the embodiments of the present disclosure, and it should be pointed out that those of ordinary skills in the art may make improvements without departing from the concept of the present disclosure, and all these improvements shall belong to the scope of protection of the present disclosure.

What is claimed is:

1. A glass lens for a lens module, comprising
an optical portion having an optical axis, and
an extending portion surrounding a periphery of the optical portion;
wherein the optical portion comprises an object-side surface and an image-side surface opposite to the object-side surface,
the extending portion comprises a first extending surface and a second extending surface disposed opposite to each other,
the first extending surface extends from the object-side surface towards a direction far away from the optical axis, and the second extending surface extends from the image-side surface towards the direction far away from the optical axis;
the first extending surface is provided with a first recess, the second extending surface is provided with a second recess, the second recess is closer to the optical axis with respect to the first recess, the first recess can change a light path of stray light, and the second recess is filled with a black substance; and
a size of the first recess along an extension direction of the optical axis is a first recess depth, a size of the second recess along the extension direction of the optical axis is a second recess depth, a distance between the first extending surface and the second extending surface is an extension thickness, and the extension thickness is less than or equal to a sum of the first recess depth and the second recess depth; and
wherein a section of the first recess along a direction parallel to the optical axis is rectangular; and a section of the second recess along the direction parallel to the optical axis is rectangular.

2. The glass lens according to claim 1, wherein the first recess is filled with a black substance.

3. The glass lens according to claim 1, wherein a first plane vertical to the optical axis is disposed, a projection of the first recess on the first plane and a projection of the second recess on the first plane are spaced apart from each other.

4. The glass lens according to claim 1, wherein the second recess depth is greater than one quarter of the extension thickness and less than two thirds of the extension thickness.

5. The glass lens according to claim 1, wherein a difference between a distance from the first recess to the optical axis and a distance from the second recess to the optical axis is a recess spacing, a dimension of the extending portion in a direction vertical to the optical axis is an extension width, and the extension width is greater than twice the recess spacing.

6. The glass lens according to claim 1, wherein the first recess is an annular recess with a central axis coincident with the optical axis.

7. The glass lens according to claim 6, wherein the second recess is an annular recess with a central axis coincident with the optical axis.

8. The glass lens according to claim 1, wherein a size of at least one of the first recess and the second recess is less than or equal to 0.1 mm along a direction vertical to the optical axis, and the black substance is black glue or black plastic.

9. The lens module according to claim 1, wherein a size of at least one of the first recess and the second recess is less than or equal to 0.1 mm along a direction vertical to the optical axis, and the black substance is black glue or black plastic.

10. A lens module, comprising: comprising a lens barrel and a glass lens,
wherein the glass lens is disposed in the lens barrel, and the glass lens comprises an optical portion having an optical axis, and an extending portion surrounding a periphery of the optical portion;
wherein the optical portion comprises an object-side surface and an image-side surface opposite to the object-side surface,
the extending portion comprises a first extending surface and a second extending surface disposed opposite to each other,
the first extending surface extends from the object-side surface towards a direction far away from the optical axis, and the second extending surface extends from the image-side surface towards the direction far away from the optical axis;
the first extending surface is provided with a first recess, the second extending surface is provided with a second recess, the second recess is closer to the optical axis with respect to the first recess, the first recess can change a light path of stray light, and the second recess is filled with a black substance; and
a size of the first recess along an extension direction of the optical axis is a first recess depth, a size of the second recess along the extension direction of the optical axis is a second recess depth, a distance between the first extending surface and the second extending surface is an extension thickness, and the extension thickness is less than or equal to a sum of the first recess depth and the second recess depth, and wherein a section of the first recess along a direction parallel to the optical axis is rectangular; and a section of the second recess along the direction parallel to the optical axis is rectangular.

11. The lens module according to claim 10, wherein the first recess is filled with a black substance.

12. The lens module according to claim 10, wherein a first plane vertical to the optical axis is disposed, a projection of the first recess on the first plane and a projection of the second recess on the first plane are spaced apart from each other.

13. The lens module according to claim 10, wherein the second recess depth is greater than one quarter of the extension thickness and less than two thirds of the extension thickness.

14. The lens module according to claim 10, wherein a difference between a distance from the first recess to the optical axis and a distance from the second recess to the optical axis is a recess spacing, a dimension of the extending portion in a direction vertical to the optical axis is an extension width, and the extension width is greater than twice the recess spacing.

15. The lens module according to claim 10, wherein the first recess is an annular recess with a central axis coincident with the optical axis.

16. The lens module according to claim 15, wherein the second recess is an annular recess with a central axis coincident with the optical axis.

* * * * *